(12) United States Patent
Jayaram et al.

(10) Patent No.: US 10,489,055 B2
(45) Date of Patent: Nov. 26, 2019

(54) Z-WAVE CONTROLLER SHIFT IN THERMOSTATS

(71) Applicant: Trane International Inc., Davidson, NC (US)

(72) Inventors: Ashwini Jayaram, Chennai (IN); Thyagarajan Krishnamurthy, Chennai (IN); Sasikanth Singamsetty, Chennai (IN)

(73) Assignee: Trane International Inc., Davidson, NC (US)

( * ) Notice: Subject to any disclaimer, the term of this patent is extended or adjusted under 35 U.S.C. 154(b) by 230 days.

(21) Appl. No.: 15/143,165

(22) Filed: Apr. 29, 2016

(65) Prior Publication Data
US 2016/0330565 A1 Nov. 10, 2016

Related U.S. Application Data

(60) Provisional application No. 62/158,587, filed on May 8, 2015.

(51) Int. Cl.
*G06F 9/4401* (2018.01)
*G06F 3/06* (2006.01)
(Continued)

(52) U.S. Cl.
CPC ............ *G06F 3/061* (2013.01); *G06F 9/441* (2013.01); *G06F 9/4416* (2013.01);
(Continued)

(58) Field of Classification Search
CPC ........ G06F 8/665; G06F 9/441; G06F 9/4416; H04L 12/2803; H04L 41/0806; H04L 67/125; H04L 12/28; H04W 4/001
See application file for complete search history.

(56) References Cited

U.S. PATENT DOCUMENTS 5,987,605 A * 11/1999 Hill .................... G06F 9/441
                                                       713/100
6,178,503 B1 * 1/2001 Madden ................ G06F 1/24
                                                        710/8
(Continued)

OTHER PUBLICATIONS

Vesternet. Ltd. "Understanding Z-Wave Networks, Nodes & Devices." Understanding Z-Wave Networks, Nodes & Devices | Vesternet, Jun. 8, 2013, www.vesternet.com/resources/technology-indepth/understanding-z-wave-networks. (Retrieved Feb. 5, 2018).*

*Primary Examiner* — Jaweed A Abbaszadeh
*Assistant Examiner* — Brian J Corcoran
(74) *Attorney, Agent, or Firm* — The Salerno Law Firm, P.C.

(57) ABSTRACT

A Z-Wave networking device is disclosed having a processor, a WiFi transceiver, a Z-Wave network transceiver, and a flash memory from which the processor boots a startup image. The processor can boot a first startup image that configures the Z-Wave network transceiver as a Z-Wave network controller, and the processor can boot a second startup image that configures the Z-Wave network transceiver as a Z-Wave repeater node. An Internet server receives registration information for the device, and instructs the device to boot from the first startup image upon determining that a Z-Wave network controller is not present in the Z-Wave network, or from the second startup image upon determining that a Z-Wave network controller is already present in the Z-Wave network. In embodiments, the Z-Wave networking device comprises an HVAC thermostat.

13 Claims, 11 Drawing Sheets

(51) Int. Cl.
*H04L 29/08* (2006.01)
*H04L 12/24* (2006.01)
*H04W 4/50* (2018.01)
*H04L 12/28* (2006.01)
*G06F 8/654* (2018.01)

(52) U.S. Cl.
CPC ...... *H04L 12/2809* (2013.01); *H04L 12/2825* (2013.01); *H04L 41/0806* (2013.01); *H04L 67/125* (2013.01); *H04W 4/50* (2018.02); *G06F 8/654* (2018.02); *H04L 2012/2841* (2013.01)

(56) References Cited

U.S. PATENT DOCUMENTS

| | | | |
|---|---|---|---|
| 6,662,220 B1* | 12/2003 | Meyer | G06F 11/2294 709/223 |
| 6,980,080 B2* | 12/2005 | Christensen | G05B 15/02 340/12.53 |
| 8,024,073 B2 | 9/2011 | Imes et al. | |
| 8,396,604 B2 | 3/2013 | Imes et al. | |
| 8,412,382 B2 | 4/2013 | Imes et al. | |
| 8,428,782 B2 | 4/2013 | Imes | |
| 8,478,447 B2 | 7/2013 | Fadell et al. | |
| 8,509,954 B2 | 8/2013 | Imes et al. | |
| 8,635,499 B2 | 1/2014 | Cohn et al. | |
| 9,007,222 B2 | 4/2015 | Mittleman et al. | |
| 9,209,652 B2 | 12/2015 | Imes et al. | |
| 2003/0043028 A1 | 3/2003 | Torikai et al. | |
| 2003/0075549 A1* | 4/2003 | O'Brien | B65D 81/3876 220/739 |
| 2004/0006647 A1 | 1/2004 | Kim et al. | |
| 2005/0283606 A1* | 12/2005 | Williams | G06F 9/4416 713/166 |
| 2007/0100666 A1 | 5/2007 | Stivoric et al. | |
| 2007/0168458 A1 | 7/2007 | Costa-Requena et al. | |
| 2007/0275715 A1 | 11/2007 | Lee et al. | |
| 2008/0058740 A1 | 3/2008 | Sullivan et al. | |
| 2009/0066534 A1 | 3/2009 | Sivakkolundhu | |
| 2010/0042764 A1* | 2/2010 | Rodriguez | G06F 13/385 710/63 |
| 2010/0138007 A1 | 6/2010 | Clark et al. | |
| 2010/0180019 A1* | 7/2010 | Elston, III | H04L 12/2809 709/222 |
| 2010/0283579 A1* | 11/2010 | Kraus | G07C 9/00944 340/5.7 |
| 2012/0130548 A1 | 5/2012 | Fadell et al. | |
| 2013/0054758 A1 | 2/2013 | Imes et al. | |
| 2013/0191755 A1* | 7/2013 | Balog | H04L 41/0806 715/735 |
| 2013/0201316 A1 | 8/2013 | Binder et al. | |
| 2013/0215902 A1* | 8/2013 | Lamb | H04L 12/2836 370/401 |
| 2013/0340046 A1 | 12/2013 | Yu et al. | |
| 2014/0052783 A1* | 2/2014 | Swatsky | H04W 80/04 709/204 |
| 2014/0084165 A1 | 3/2014 | Fadell et al. | |
| 2014/0085092 A1 | 3/2014 | Fadell et al. | |
| 2014/0085093 A1 | 3/2014 | Mittleman et al. | |
| 2014/0173059 A1* | 6/2014 | Koningstein | H04L 41/0806 709/220 |
| 2014/0266669 A1 | 9/2014 | Fadell et al. | |
| 2014/0266681 A1 | 9/2014 | Dunn et al. | |
| 2014/0269660 A1* | 9/2014 | Dunn | H04L 12/283 370/338 |
| 2014/0282480 A1 | 9/2014 | Matthew et al. | |
| 2015/0051717 A1* | 2/2015 | Krutsch | G05B 15/02 700/90 |
| 2015/0096170 A1 | 4/2015 | Mittleman et al. | |
| 2015/0096876 A1 | 4/2015 | Mittleman et al. | |
| 2015/0100167 A1 | 4/2015 | Sloo et al. | |
| 2015/0292764 A1 | 10/2015 | Land, III et al. | |
| 2016/0205196 A1* | 7/2016 | Hasan | F24F 11/00 709/208 |

* cited by examiner

Z-WAVE CONTROLLER SHIFT IN THERMOSTATS

CROSS-REFERENCE TO RELATED APPLICATION

This application claims the benefit of and priority to U.S. Provisional Application Ser. No. 62/158,587 entitled "Z-WAVE CONTROLLER SHIFT IN THERMOSTATS" and filed May 8, 2015, the entirety of which is hereby incorporated by reference herein for all purposes.

BACKGROUND

1. Technical Field

The present disclosure generally relates to Z-wave network technology, and in particular, to a thermostat that joins a Z-wave network as either a primary controller or as a repeater that acts as a gateway for home automation.

2. Background of Related Art

Command systems for commercial building and residential automation functions are available using a range of technologies. Among numerous technologies currently in use are X10®, Z-Wave® and Zigbee® technologies. Z-Wave technology is supported by a consortium of users and product developers, who have promulgated a set of Z-Wave communication standards that available through Zensys and the Z-Wave Alliance.

Z-Wave is a wireless home automation protocol that operates in the 908.42 MHz frequency band. One of the features of Z-Wave is that it utilizes a type of network known as a "mesh network," which means that one Z-Wave device will pass a data frame along to another Z-Wave device in the network until the data frame reaches a destination device.

A Z-Wave network comprises a primary controller (hereinafter "controller") and at least one controllable device, known as a slave node, or more simply, a "node." The controller establishes the Z-Wave network. The controller is the only device in a Z-Wave network that determines which Z-Wave nodes belong to the network. There can be only one primary controller in the Z-Wave network. The Home ID of the primary controller identifies the Z-Wave network. An example of a primary controller may be a portable remote controller or a thermostat.

The primary controller is used to add or remove nodes from the network. The process of adding or removing nodes, also known as inclusion/exclusion, requires that the controller must be within direct radio frequency (RF) range of the node that is to be added or deleted from the network. The user must interact with the controller and the device during this process. For example, to start the process, the controller and the device should be brought together in close physical proximity. Next, the controller is placed in an inclusion mode. Then the device is activated so that it will enroll in the Z-Wave network.

After nodes are added to the network, the primary controller is responsible for determining communication routes to nodes, based on feedback from every node that the controller adds to the network. Additional nodes can be added at any time.

The data communication protocol established in a Z-Wave network uses a 32 bit unique identifier called the Home ID to identify separate Z-Wave networks that may be in range of each other. An 8-bit identifier, called the Node ID, is used to address individual Z-Wave devices (nodes) in the same network. A Z-Wave node will only respond to Z-Wave frames containing the Home ID and a Node ID that has been assigned to the node. Nodes typically receive data frames and reply, if necessary. Nodes cannot host preconfigured routes to other nodes. Typically, nodes are devices that only require input (and report status if polled), and generally do not generate unsolicited frames.

A Z-Wave node is a device that replies to messages addressed to that node. In addition, any node that receives a data frame addressed to other nodes can retransmit the data frame, thereby acting as a repeater and establishing the mesh network functionality. A node must be in a listening state to act as repeater. Such nodes must have a utility source of power. To limit battery consumption, nodes powered by batteries will not practically be configured to act as repeaters. Repeaters in the Z-Wave network help to extend the overall range and robustness of the mesh network.

Examples of nodes are light switches and dimmers for home automation, sensors (such as motion detection), HVAC devices such as thermostats and environmental sensors, door locks (entry control), appliances such as refrigerators, microwave ovens, dish washers, dryers, etc., and energy management applications that monitor electric usage.

Nodes that send command messages to control other devices in the Z-Wave network are known as controllers. Controllers added to an existing Z-Wave network can become secondary controllers. Secondary controllers may include traditional hand-held controllers, key-fob controllers, wall-switch controllers and PC applications designed for management and control of devices in a Z-Wave network.

SUMMARY

Embodiments of the present disclosure provide a Z-Wave networking device, having a processor, an Internet WiFi transceiver, a Z-Wave network transceiver, and a flash memory from which the processor boots a startup image. The processor can boot a first startup image that configures the Z-Wave network transceiver as a Z-Wave network controller, and the processor can boot a second startup image that configures the Z-Wave network transceiver as a Z-Wave repeater node.

In an embodiment, the device is configured to flash the flash memory with the second startup image and reboot the processor. In another embodiment, the device flashes the flash memory and reboots the processor in response to a command received by the Internet WiFi transceiver. In another embodiment, the device is a thermostat.

Another embodiment of the present disclosure provides an Internet server for managing Z-Wave networking devices in a Z-Wave network having an HTTP server and an Internet protocol server. The HTTP server receives registration information concerning a new device for addition to the Z-Wave network. The Internet protocol server directs a controller on the Z-Wave network into inclusion mode to add the new device. The Internet protocol server directs the new device to reconfigure as a Z-Wave repeater before enrolling in the Z-Wave network.

Another embodiment of the present disclosure provides a system for adding a Z-Wave networking device to a Z-Wave network. The system includes an Internet server and the Z-Wave networking device in communication with the Internet server through an Internet. The Z-Wave networking device includes a processor, an Internet WiFi transceiver, a Z-Wave network transceiver, and a flash memory from which the processor can boot either first or second startup images. A user registers the device with the Internet server, and the Internet server instructs the device to boot the processor from the first startup image that configures the Z-Wave network transceiver as a controller for the Z-Wave network.

In an embodiment, the invention further provides that the Internet server instructs the device to load the second startup image into the flash memory, and reboots the processor such that the Z-Wave network transceiver joins the Z-Wave network configured as a Z-Wave repeater node when the user registers the device with the Internet server and the Internet server determines that the Z-Wave network already comprises a device configured as a controller. In another embodiment, the Z-Wave networking device is a thermostat.

Another embodiment of the present disclosure provides a method of adding a Z-Wave networking device having a processor that boots from a flash memory to a Z-Wave network. The method includes an Internet server receiving registration information for the device, and the server instructing the device to boot from the first startup image that configures the device as a controller for the Z-Wave network. In an embodiment, the invention further provides the server determining that the Z-Wave network already comprises a device configured as a controller, and the server instructing the device to load a second startup image into the flash memory and to reboot the processor such that the device joins the Z-Wave network configured as a Z-Wave repeater node.

BRIEF DESCRIPTION OF THE DRAWINGS

Various embodiments of the present disclosure are described herein with reference to the drawings wherein.

DETAILED DESCRIPTION

Figure 1:
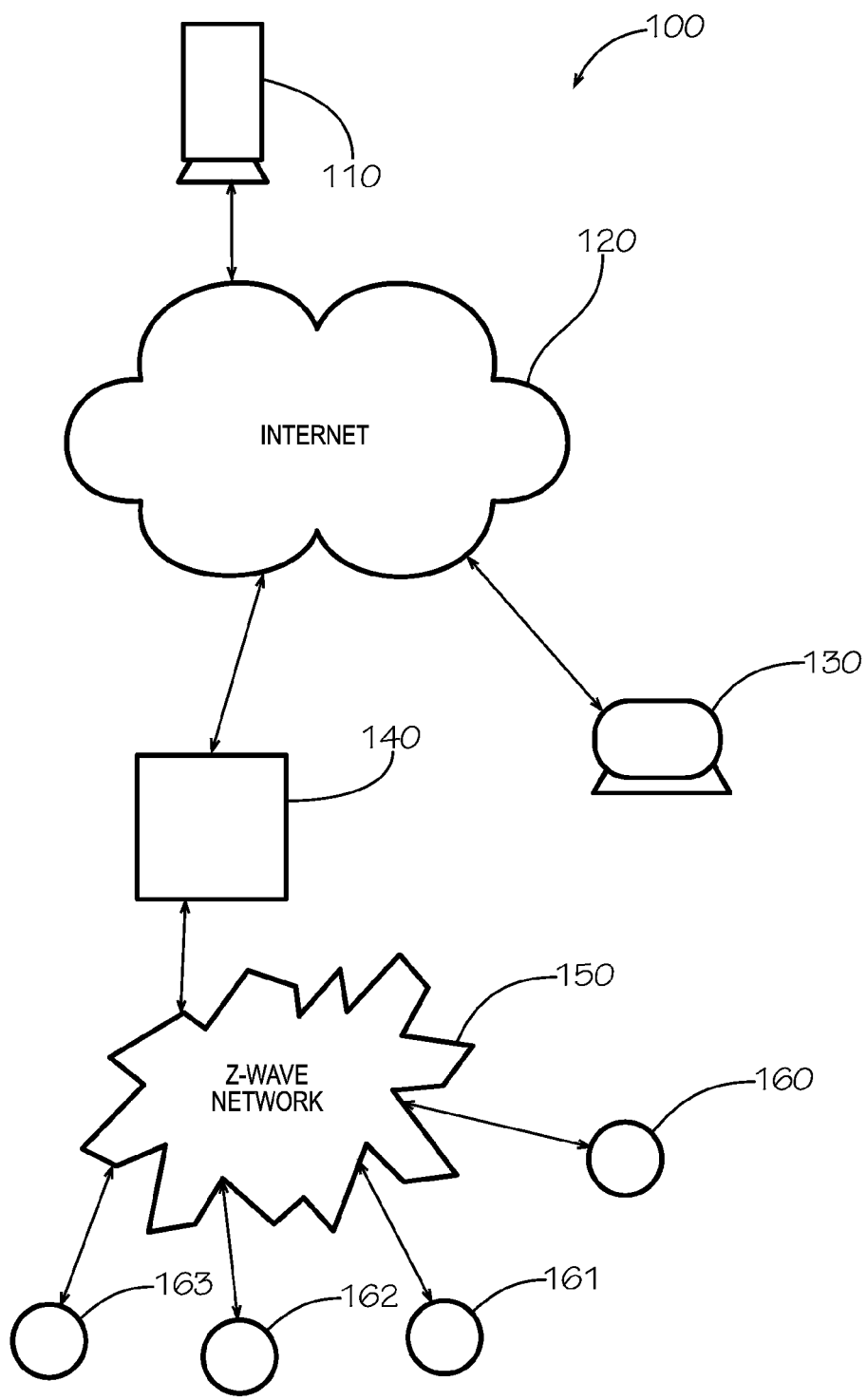
FIG. 1 is a schematic diagram of an internetworking system in accordance with an embodiment of the present disclosure.

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is described herein in terms of functional block components and various processing steps. It should be appreciated that such functional blocks configured to perform the specified functions may be embodied in analog circuitry, digital circuitry, and/or instructions executable on a processor. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. It should be appreciated that the particular implementations described herein are illustrative of the disclosure and its best mode and are not intended to otherwise limit the scope of the present disclosure in any way.

FIG. 1 illustrates a schematic diagram of an embodiment of an internetworking system 100 in accordance with the present disclosure. The internetworking system 100 includes Internet 120 and Z-Wave network 150. As shown in FIG. 1, a number of devices are in communication with each other over Internet 120, including a portal server 110, a user device 130 and a Z-Wave networking device 140. User device 130 may communicate with portal server 110 through a web browser interface, using standard hypertext transfer protocol (HTTP). Portal server 110 preferably communicates with Z-Wave networking device 140 through lower layer Internet protocols, such as Transmission Control Protocol/Internet Protocol (TCP/IP) or User Datagram Protocol/Internet Protocol (UDP/IP).

Z-Wave networking device 140 conducts radio frequency (RF) communications with Z-Wave networking devices 160-163. It should be noted that some devices 160-163 may be in direct communication with Z-Wave networking device 140. As Z-Wave network 150 is a mesh network, some devices 160-163 may communicate with Z-Wave networking device 140 indirectly, through other devices 160-163. Z-Wave networking device 140 is illustrated in more detail in FIG. 2.

Figure 2:
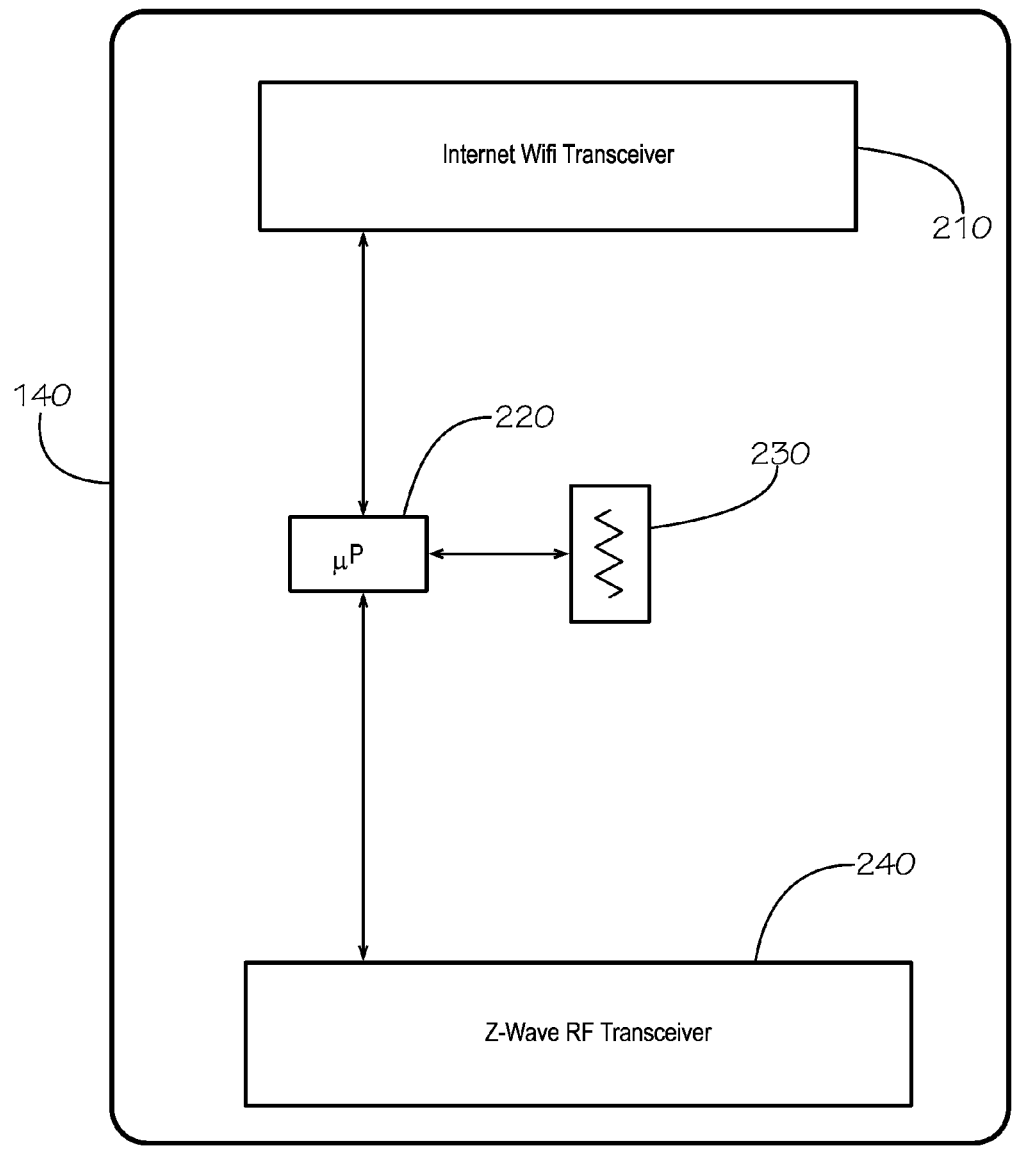
FIG. 2 is a schematic block diagram of components in a Z-Wave networking device in accordance with an embodiment of the present disclosure.

FIG. 2 is a schematic block diagram of components in an embodiment of a Z-Wave networking device in accordance with the present disclosure. As shown in FIG. 2, Z-Wave networking device 140 is preferably comprised of an Internet WiFi transceiver 210, a processor 220, a flash memory 230 and a Z-wave RF transceiver 240. Internet WiFi transceiver 210 provides Z-Wave networking device 140 with the ability to transmit and receive Internet Protocol (IP) data packets across a WiFi network, as is well known in the art.

Such packets may be routed through and beyond the immediate WiFi network through Internet 120 to portal server 110, as illustrated in FIG. 1.

Z-Wave transceiver 240 provides Z-wave networking device 140 with the ability to transmit and receive Z-Wave data frames across Z-Wave network addressed to other Z-Wave devices, as illustrated in FIG. 1.

Processor 220 performs computations according to software code stored on flash memory 230, to control the overall operation of Z-Wave networking device 140. Processor 220 may respond to data packets received from either Internet WiFi transceiver 210 or Z-Wave network transceiver 240. In addition, processor 220 may form new data frames to send to Z-Wave network via Z-Wave transceiver 240 in response to data packets received from Internet WiFi transceiver 210, and vice-versa. Thus, it can be said that Z-Wave networking device 140 acts as a bridge between said Internet 120 and said Z-Wave network 150.

During a boot process, processor 220 reads software code stored on flash memory 230 and initializes said Internet WiFi transceiver 210 and said Z-Wave transceiver 240. Processor 220 may either configure Z-Wave transceiver 240 as a controller for a Z-Wave network, or as a repeater on said Z-Wave network.

Figure 3:
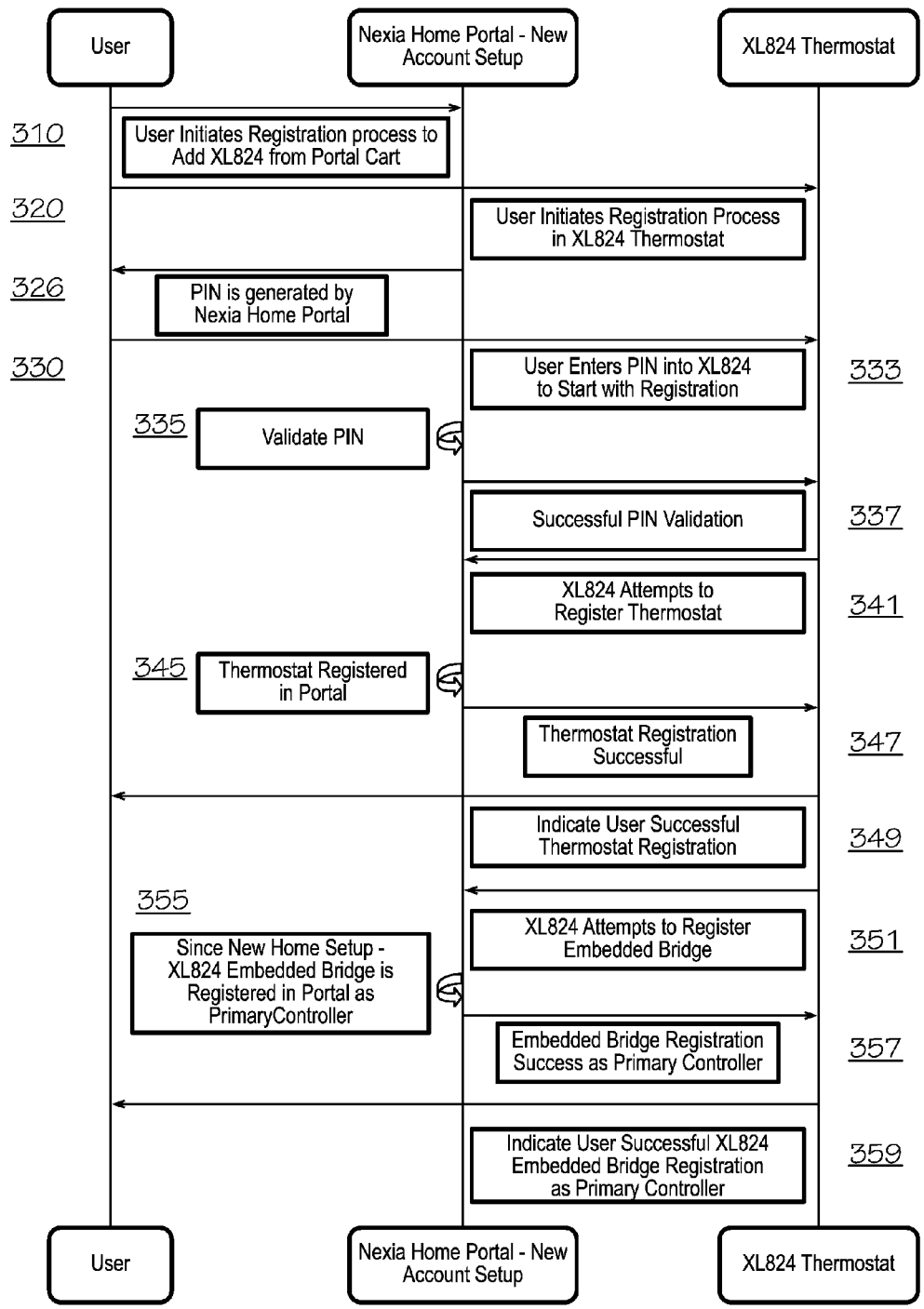
FIG. 3 is a flow diagram of the process for registering a thermostat having an embedded Z-Wave networking device with an Internet portal server and establishing the Z-Wave networking device as a controller in a Z-Wave network in accordance with an embodiment of the present disclosure.

FIG. 3 is a flow diagram of the process for registering a thermostat having an embedded Z-Wave networking device with an Internet portal server and establishing the Z-Wave networking device as a controller in a Z-Wave network.

As shown in FIG. 3, and with reference to FIG. 1, in step 310, a user initiates a registration process with an Internet portal server. In a preferred embodiment, the portal server is a NEXIA™ Home Portal. The NEXIA™ Bridge (Generation 1) is a Z-Wave security-enabled device that serves as the Z-Wave network's hub by connecting to an Internet router. It uses a low-power, wireless signal (Z-Wave) to communicate with all of the Z-Wave or NEXIA™-enabled devices throughout a home. The result is control of a home's most important systems—locks, thermostats, lights and more—from anywhere remotely using NEXIA™ Home Intelligence Portal. NEXIA™ Bridge can hold and control more than 200 Z-Wave products that enables a user to start small and grow a system as desired. NEXIA™ Home Intelligence portal server can be accessed from most Internet-enabled user devices, such as a personal computer, tablet, or cellular telephony smart phone, having a web browser available thereon, as is ubiquitous as is the Internet to which said user device and portal server are connected.

In a registration process of a preferred embodiment, the user registers a particular Z-Wave networking device, such as a TRANE™ model XL824 thermostat. The XL824 is a First touch based Wi-Fi thermostat that has an Embedded Bridge on board similar to the NEXIA™ Bridge that acts as gateway for home automation and also designed to work on all standard HVAC systems.

The XL824 Thermostat registration has two parts: the first part registering the thermostat to the NEXIA™ portal server, and the second part involves registering the embedded bridge to the NEXIA™ portal server. The XL824 thermostat uses a unified registration mechanism to the NEXIA™ Home enrolling the XL824 (thermostat and Embedded Bridge) in a single process as seen by the user. A NEXIA™ 'Home' is a single ZWave network controlled by NEXIA™ Home Intelligence portal. The XL824 thermostat communicates directly with the NEXIA™ Home via a Wi-Fi connection.

The first part of the registration process begins with step 320. As illustrated in step 320, the user initiates the registration process for the Z-Wave networking device (thermostat) on the portal server through a web-browser enabled user device.

As shown in step 326, the portal server responds to the user by supplying a personal identification number (PIN) for the Z-Wave networking device (thermostat). The PIN ensures identification and proper registration of the thermostat.

In step 330, the user enters the PIN into the thermostat to start the registration process. As shown in step 333, the thermostat transmits the PIN to the portal server. In step 335, the portal server validates the PIN received from the thermostat. In step 337, the portal server sends a message back to the thermostat via the Internet indicating successful validation of the PIN.

In step 341, the thermostat sends a message to the portal server comprising information to register the thermostat with the portal server. In step 345, the portal server receives and records the information, and then in step 347, transmits a message back to the thermostat indicating successful registration. The thermostat, in step 349, then displays a screen indicating successful registration of the thermostat to the user.

Next, in step 351, the thermostat sends a message to the portal server comprising information to register the Z-Wave transceiver (embedded bridge) as a Z-Wave controller. In step 355, the portal server recognizes that no previous Z-Wave controllers have been registered in the location, and logs the information registering the thermostat as a primary Z-Wave controller. Then, in step 357, the portal server sends a message back to the thermostat indicating successful registration of the Z-Wave transceiver (embedded bridge) as a Z-Wave controller. Finally, the thermostat displays a screen indicating that the registration process was successful to the user, as shown in step 359.

Any Z-wave network can have only one primary controller. If a user wishes to have 2 thermostats in one NEXIA™ Home, or a NEXIA™ Bridge is already present in a NEXIA™ Home, a particular problem arises. Namely, there will be two primary controllers in same home, which means that there will be two separate Z-Wave networks. This will be undesirable from the user's point of view, because they will be able to control only those devices from the primary controller for a particular Z-Wave network, since there cannot be two primary controllers in the network.

The inventor's solution to this problem is to ensure that the portal server controls the registration process. When a user tries to enroll an XL824 thermostat into the NEXIA™ Home, the portal server registers the thermostat first. When the embedded bridge is being enrolled into the portal server, the portal server informs the XL824 that a primary controller (XL824 or NEXIA™ Bridge) is already present in the NEXIA™ Home, the XL824 then changes the firmware of the embedded bridge to act as a routing slave. The embedded bridge enrolls as a repeater into the already existing Z-Wave network. Each subsequent embedded bridge that is registered into that NEXIA™ Home will be enrolled as a network repeater. Enrolling the XL824 as repeater in the network will ultimately boost the overall range and robustness of Z-Wave network.

Figure 4:
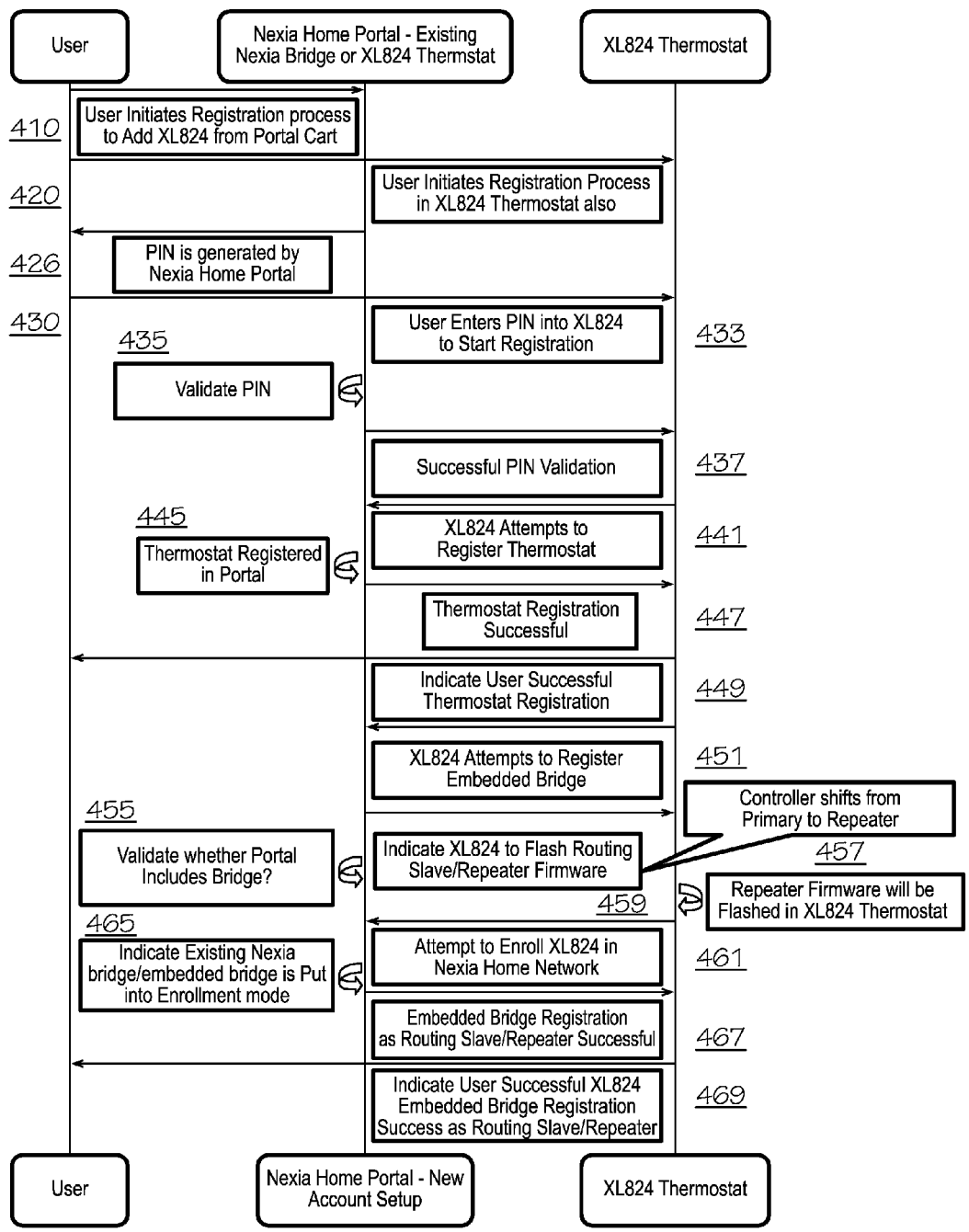
FIG. 4 is a flow diagram of the process for registering a thermostat having an embedded Z-Wave networking device with an Internet portal server and configuring the Z-Wave networking device as a repeater in a Z-Wave network in accordance with an embodiment of the present disclosure.

FIG. 4 is a flow diagram of the process for registering a thermostat having an embedded Z-Wave networking device with an Internet portal server and configuring the Z-Wave networking device as a repeater in a Z-Wave network. One may note that the process is very similar to that of FIG. 3.

As shown in FIG. 4, in step 410, a user initiates a registration process with an Internet portal server. In a preferred embodiment, the portal server is a NEXIA™ Home Portal, and the user registers a particular Z-Wave networking device, such as a TRANE™ model XL824 thermostat.

In step 420, the user initiates the registration process on the Z-Wave networking device (thermostat).

As shown in step 426, the portal server responds to the user by supplying a personal identification number (PIN) for the Z-Wave networking device (thermostat). The PIN ensures identification and proper registration of the thermostat.

In step 430, the user enters the PIN into the thermostat to start the registration process. As shown in step 433, the thermostat transmits the PIN to the portal server. In step 435, the portal server validates the PIN received from the thermostat. In step 437, the portal server sends a message back to the thermostat via the Internet indicating successful validation of the PIN.

In step 441, the thermostat sends a message to the portal server comprising information to register the thermostat with the portal server. In step 445, the portal server receives and records the information, and then in step 447, transmits a message back to the thermostat indicating successful registration. The thermostat, in step 449, then displays a screen indicating successful registration of the thermostat to the user.

Next, in step 451, the thermostat sends a message to the portal server comprising information to enroll the Z-Wave transceiver (embedded bridge) as a Z-Wave controller in the NEXIA™ Home network. In step 455, the portal server recognizes that a previous Z-Wave controller has been registered in the location. Then, in step 457, the portal server sends a message back to the thermostat indicating that it must flash its memory to reconfigure the Z-Wave transceiver (embedded bridge). In step 459, the thermostat flashes its memory to configure the embedded bridge as a Z-Wave repeater. After the configuration, the thermostat continues the registration process for the Z-Wave transceiver (embedded bridge). The Z-Wave transceiver (embedded bridge) enrollment process in the Z-Wave network occurs automatically, without any user intervention. Based on the data received by the portal server, the Z-Wave controller (XL824 or NEXIA™ Bridge) is automatically placed into inclusion mode and new Z-Wave repeater is enrolled into the existing Z-Wave network as a repeater.

Next, in step 461, the thermostat sends a message to the portal server comprising information to enroll the Z-Wave transceiver (embedded bridge) as a Z-Wave repeater in the NEXIA™ Home network. In step 465, the portal server sends commands to the existing Z-Wave controller (XL824 or NEXIA™ Bridge), placing the controller into inclusion mode and the new Z-Wave transceiver (thermostat) joins the Z-Wave network as a Z-Wave repeater. Then, in step 467, the portal server sends a message back to the thermostat indicating successful registration of the Z-Wave transceiver (embedded bridge) as a Z-Wave repeater. Finally, the thermostat displays a screen indicating that the registration process was successful to the user, as shown in step 469. At the conclusion of this process, the first XL824 Thermostat or NEXIA™ Bridge that is registered remains as the Z-Wave controller, and will be able to add/delete Z-wave devices into/from the Z-Wave network. The second XL824 Thermostat will act as a Z-Wave repeater in the network, which ultimately boosts the overall range and robustness of Z-Wave network.

Figure 5A:
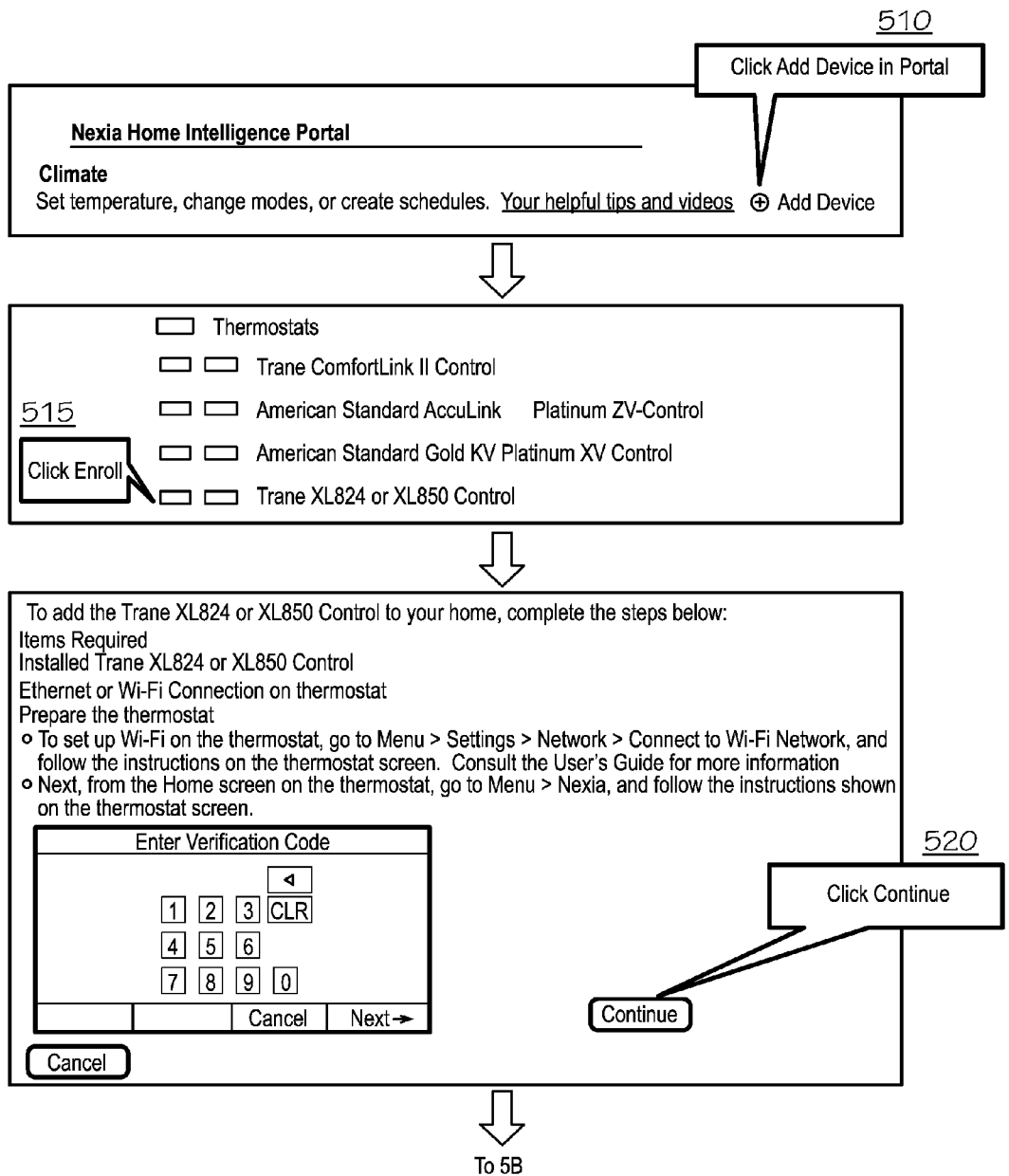
FIGS. 5A and 5B are a series of screen diagrams from an Internet portal server in accordance with an embodiment of the present disclosure.
Figure 5B:
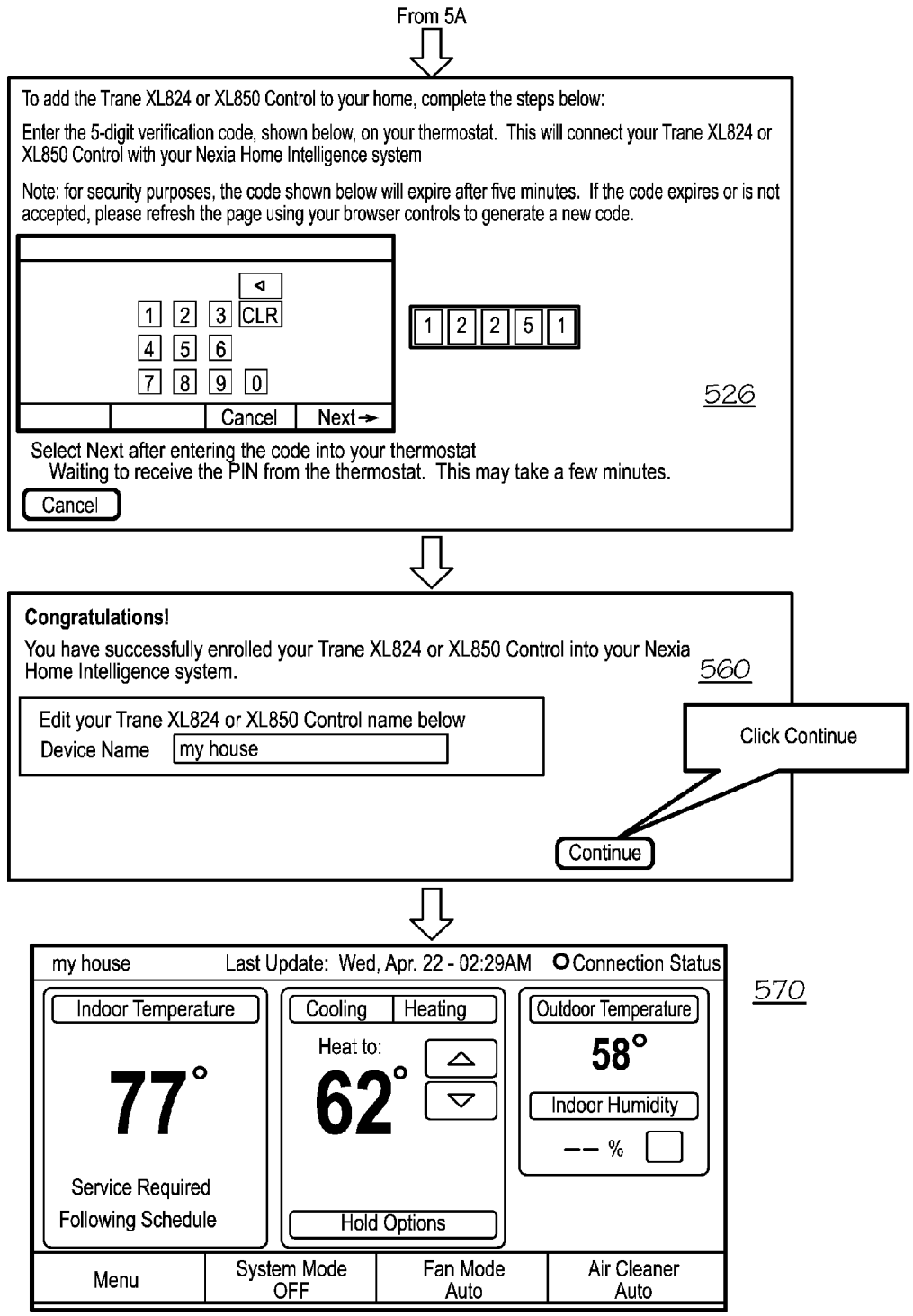

FIGS. 5A and 5B illustrate a series of screen diagrams from an Internet portal server during the a preferred registration process. As stated above, FIGS. 5A and 5B illustrate a preferred embodiment, wherein the portal server is a NEXIA™ Home Portal. As shown in 510, the user clicks a link to add a thermostat device. As shown in 515, the user chooses the thermostat device that the user wishes to enroll. In screen 520, the user is presented with instructions to establish the thermostat with Internet WiFi connectivity. After clicking "Continue," the portal server provides the user with screen 526, indicating the PIN generated by the portal server, and instructs the user to enter the PIN on the thermostat. After the registration process succeeds, the portal server presents screen 560, that shows the user that the thermostat has been successfully registered. After the user enters identifying information and clicks "Continue," the portal server displays screen 570 to provide controls and indications to the user for the thermostat.

Figure 6A:
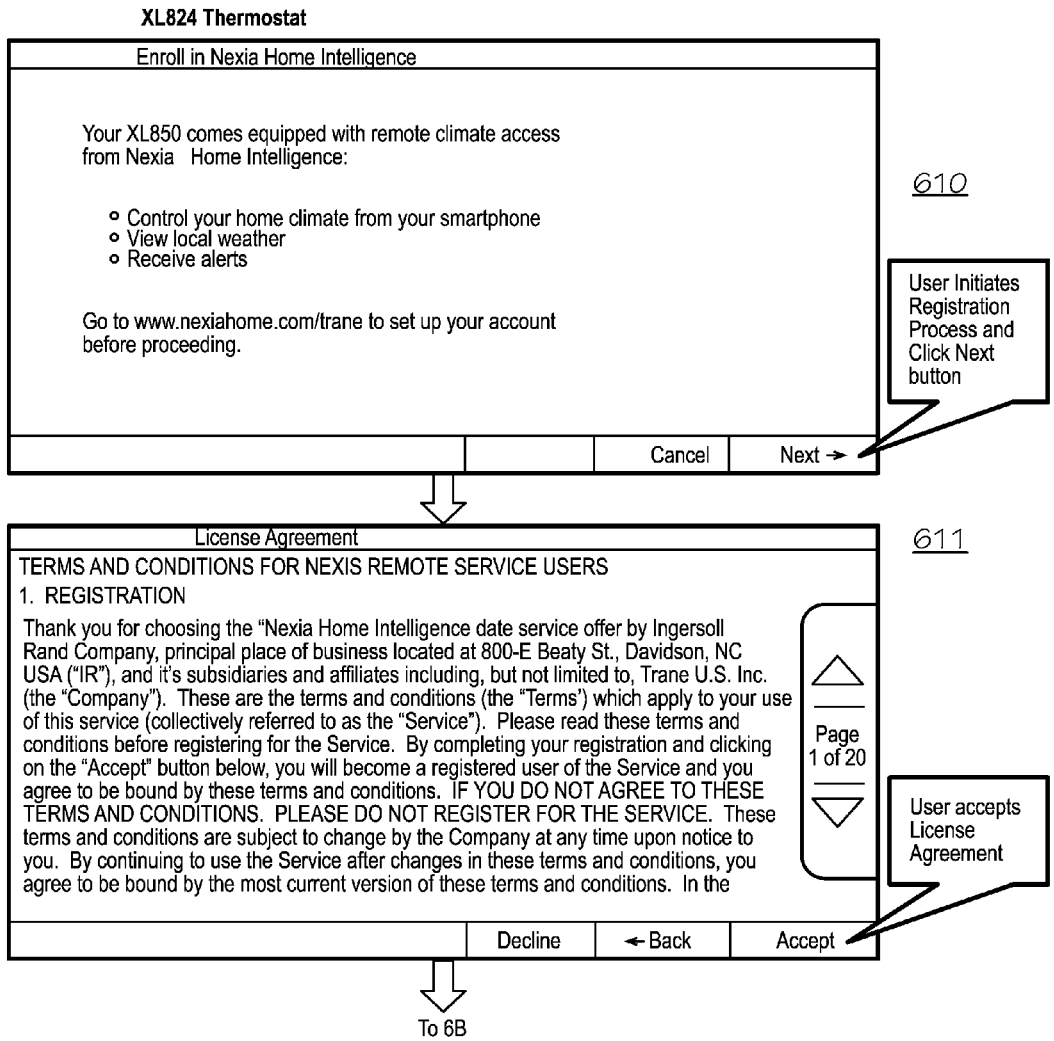
FIGS. 6A and 6B are a series of screen diagrams of a thermostat during a first part of a registration process in accordance with an embodiment of the present disclosure.
Figure 6B:
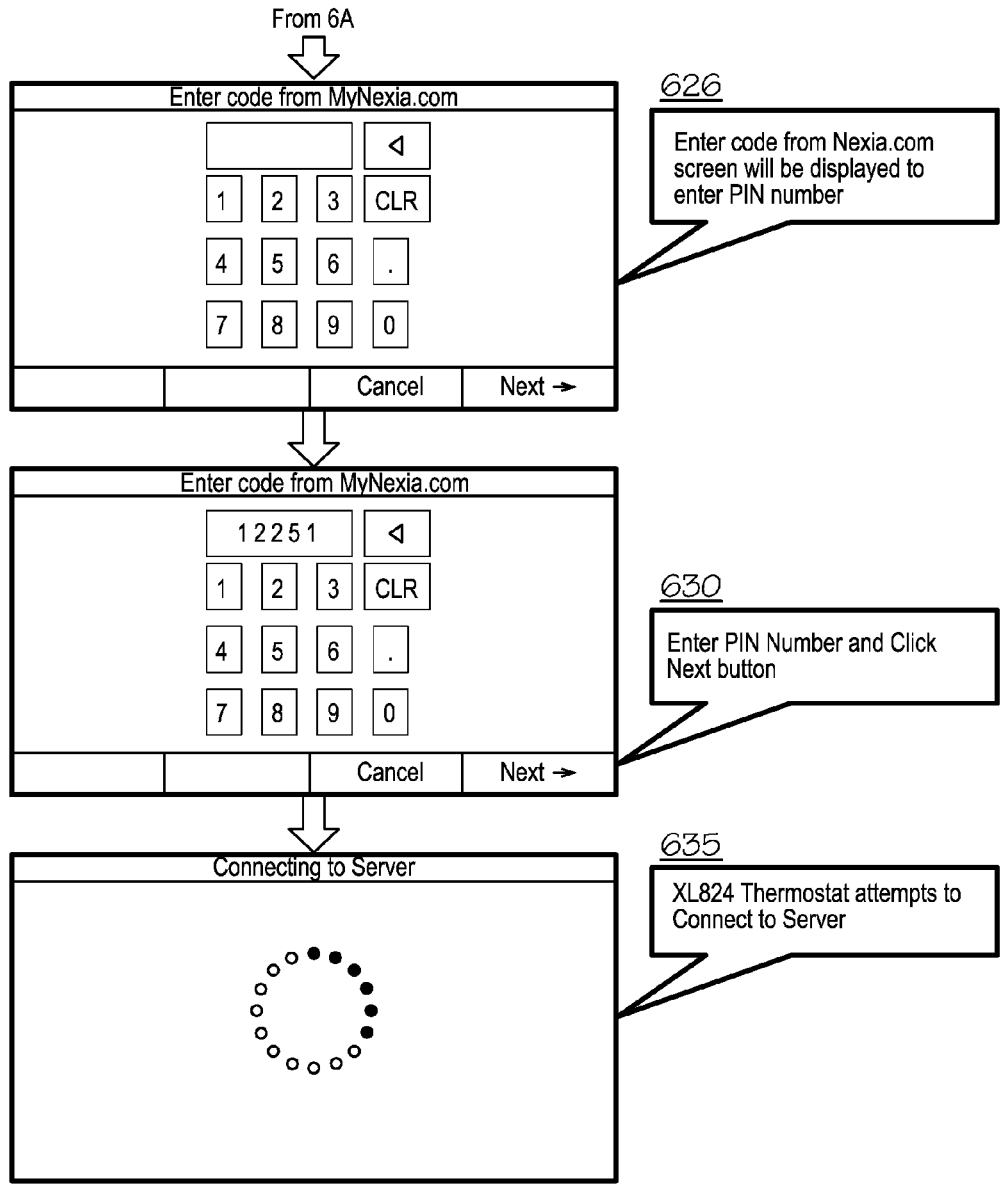

FIGS. 6A and 6B are a series of screen diagrams of a thermostat during a first part of a preferred registration process. As stated above, the screens illustrate a particular Z-Wave networking device, such as a TRANE™ model XL824 thermostat. Screen 610 illustrates the initial screen for the registration process, which the user initiates by clicking "Next." Screen 611 displays licensing information that the user must accept to proceed with the registration process. After clicking "Accept," the thermostat displays screen 626, which provides an interface for the user to enter a PIN. Screen 630 illustrates entry of the PIN by the user. After clicking "Next," screen 635 illustrates the thermostat initiating communications with the portal server, as described above in connection with FIGS. 3 & 4.

Figure 7:
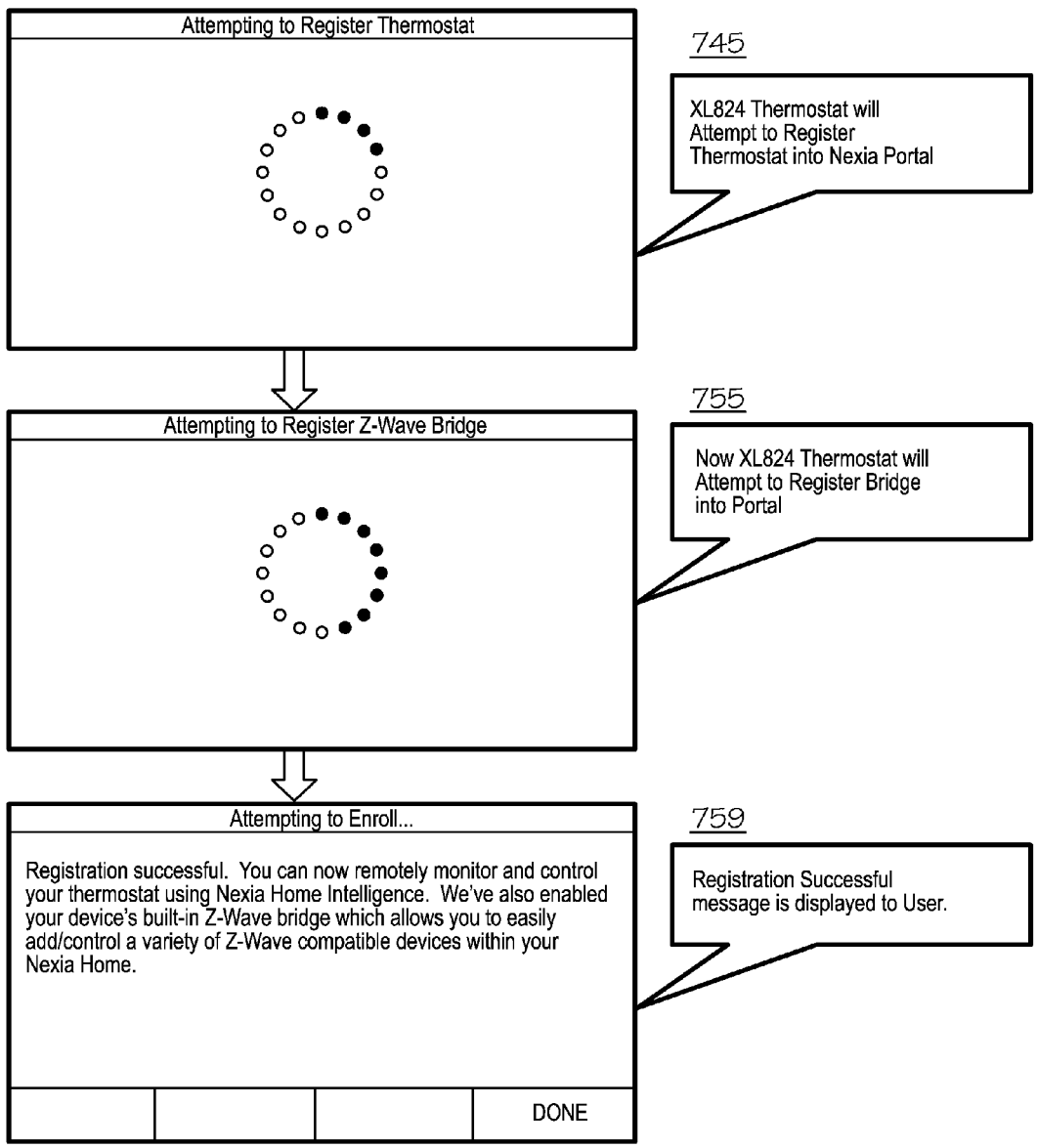
FIG. 7 is a series of screen diagrams of a thermostat during a second part of a registration process when establishing an embedded Z-Wave networking device as a controller in accordance with an embodiment of the present disclosure.

FIG. 7 is a series of screen diagrams of a thermostat during a second part of a registration process when establishing an embedded Z-Wave networking device as a controller. As stated above, the screens illustrate a particular Z-Wave networking device, such as a TRANE™ model XL824 thermostat. FIG. 7 illustrates the screens that follow those illustrated in FIGS. 6A and 6B. As shown in screen 745, the thermostat is in the process of registering itself with the portal server. Once said registration is successful, the thermostat then indicates that it is registering the the Z-Wave transceiver (embedded bridge), as shown in screen 755. In screen 759, the thermostat indicates that it has successfully registered the Z-Wave bridge as a controller, so that the user can control Z-Wave devices through the portal server.

Figure 8A:
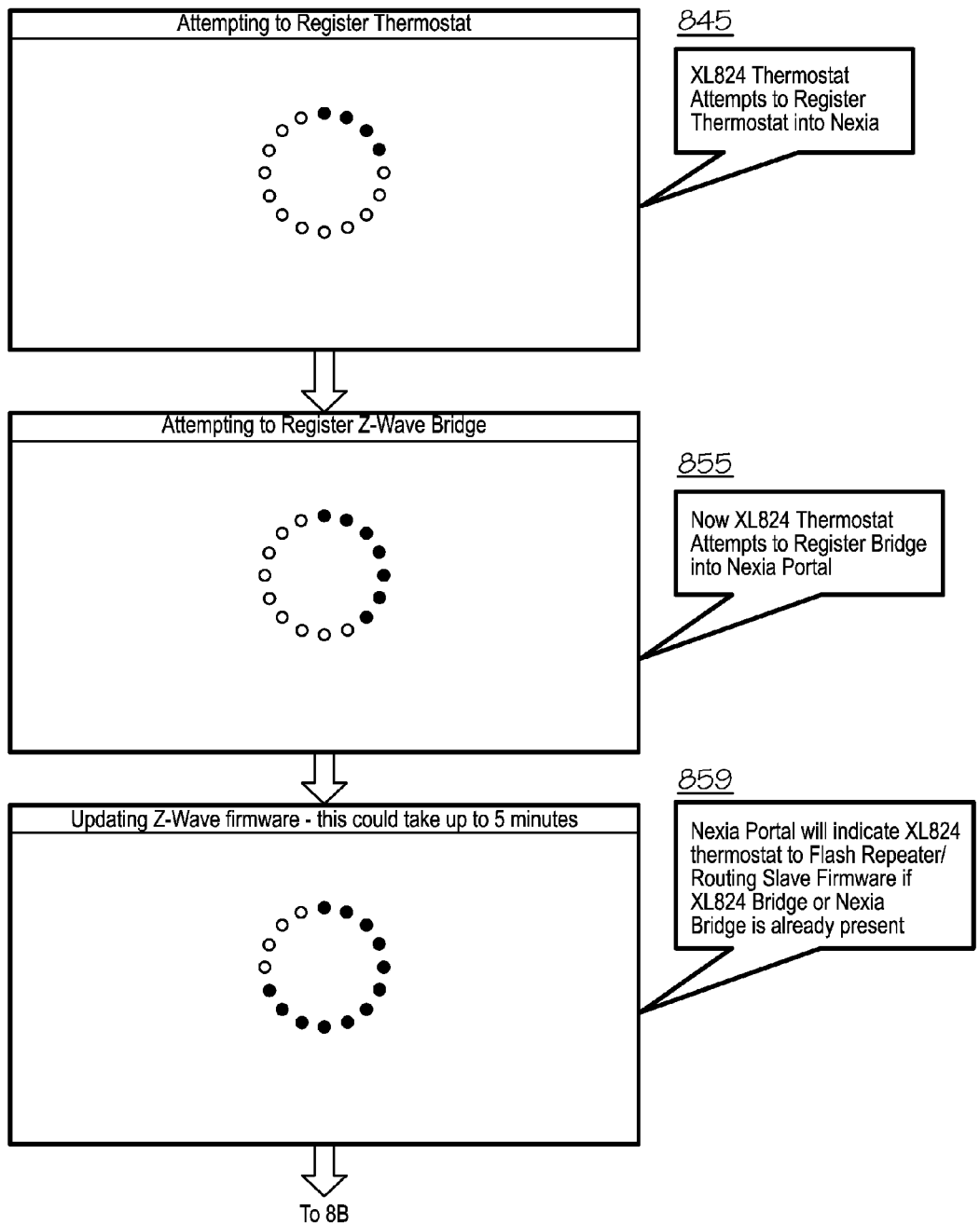
FIGS. 8A and 8B are a series of screen diagrams of a thermostat during a second part of a registration process when configuring an embedded Z-Wave networking device as a repeater in accordance with an embodiment of the present disclosure.
Figure 8B:
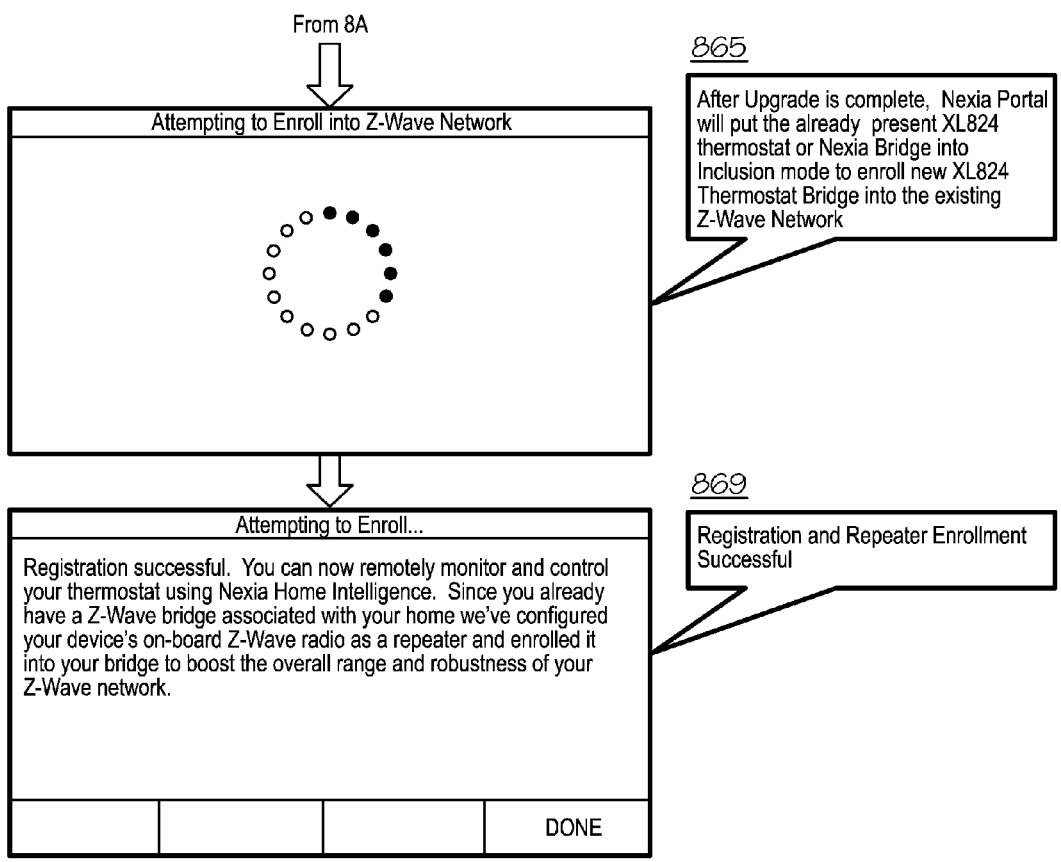

FIGS. 8A and 8B are a series of screen diagrams of a thermostat during a second part of a registration process when configuring an embedded Z-Wave networking device as a repeater. As stated above, the screens illustrate a particular Z-Wave networking device, such as a TRANE™ model XL824 thermostat. FIGS. 8A and 8B illustrate the screens that follow those illustrated in FIGS. 6A and 6B. As shown in screen 845, the thermostat is in the process of registering itself with the portal server. Once said registration is successful, the thermostat then indicates that it is registering the the Z-Wave transceiver (embedded bridge), as shown in screen 855. In screen 859, the thermostat indicates that it must reconfigure the Z-Wave transceiver (embedded bridge) as a repeater, and that the process could take up to 5 minutes. After the thermostat has reconfigured its embedded bridge as a repeater, the portal server sends commands to place the existing Z-Wave controller (XL824 or NEXIA™ Bridge) in inclusion mode to enroll the new Z-Wave transceiver (embedded bridge) in the Z-Wave network, as shown in screen 865. After the thermostat has registered the Z-Wave bridge, the thermostat indicates successful registration, as shown in screen 869.

ASPECTS

It is noted that any of aspects 1-7, any of aspects 8-11, any of aspects 12-13, and/or any of aspects 14-16 may be combined with each other in any combination.

Aspect 1. A networking device, comprising a processor; an Internet WiFi transceiver; a network transceiver; and a flash memory from which the processor boots a startup image; wherein the processor can boot a first startup image that configures the network transceiver as a network controller; and wherein the processor can boot a second startup image that configures the network transceiver as a repeater node.

Aspect 2. The networking device in accordance with aspect 1, wherein the networking device is configured to flash the flash memory with the second startup image and reboot the processor.

Aspect 3. The networking device in accordance with any of aspects 1-2, wherein the networking device flashes the flash memory and reboots the processor in response to a command received by the Internet WiFi transceiver.

Aspect 4. The networking device in accordance with any of aspects 1-3, wherein the networking device includes a thermostat.

Aspect 5. The networking device in accordance with any of aspects 1-4, wherein the network transceiver is a Z-Wave network transceiver.

Aspect 6. The networking device in accordance with any of aspects 1-5, wherein the first startup image configures the network transceiver as a Z-Wave network controller.

Aspect 7. The networking device in accordance with any of aspects 1-6, wherein the second startup image configures the network transceiver as a Z-Wave repeater node.

Aspect 8. A system for adding a Z-Wave networking device to a Z-Wave network, the system comprising a remote server; and the Z-Wave networking device in communication with the remote server, wherein the Z-Wave networking device comprises a processor; a WiFi transceiver; a Z-Wave network transceiver; and a flash memory from which the processor can boot either first or second startup images; wherein a user registers the Z-Wave networking device with the remote server; and wherein the remote server determines whether the Z-Wave network comprises a device configured as a controller.

Aspect 9. The system in accordance with aspect 8, wherein the remote server instructs the Z-Wave networking device to load the first startup image into the flash memory and reboots the processor such that the Z-Wave network transceiver joins the Z-Wave network configured as a Z-Wave controller node when the remote server determines that the Z-Wave network does not comprise a device configured as a controller.

Aspect 10. The system in accordance with any of aspects 8-9, wherein the remote server instructs the Z-Wave networking device to load the second startup image into the flash memory and reboots the processor such that the Z-Wave network transceiver joins the Z-Wave network configured as a Z-Wave repeater node when the remote server determines that the Z-Wave network already comprises a device configured as a controller.

Aspect 11. The system in accordance with any of aspects 8-10, wherein the Z-Wave networking device is a thermostat.

Aspect 12. A method of adding a Z-Wave networking device to a Z-Wave network, the device having a processor and a flash memory from which the processor can boot either first or second startup images, the method comprising an Internet server receiving registration information for the device; and the server instructing the device to boot from the first startup image that configures the device as a controller for the Z-Wave network.

Aspect 13. The method in accordance with aspect 12, further comprising the server determining that the Z-Wave network already comprises a device configured as a controller; and the server instructing the device to load the second startup image into the flash memory and to reboot the processor such that the device joins the Z-Wave network configured as a Z-Wave repeater node.

Aspect 14. An Internet server for managing Z-Wave networking devices in a Z-Wave network, comprising an HTTP server; and an Internet protocol server; wherein the HTTP server receives registration information concerning a new device for addition to the Z-Wave network.

Aspect 15. The Internet server in accordance with aspect 14, wherein the Internet protocol server directs a controller on the Z-Wave network into inclusion mode to add the new device.

Aspect 16. The Internet server in accordance with any of aspects 14-15, wherein the Internet protocol server directs the new device to reconfigure as a Z-Wave repeater before enrolling in the Z-Wave network.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure. Further, since numerous modifications and variations will readily occur to those of ordinary skill in the art, it is not desired to limit the disclosure to the exact construction and operation illustrated and described, and, accordingly, all suitable modifications and equivalents that may be resorted to are regarded as being within the scope and spirit of the present disclosure.

What is claimed is:

1. A networking device, comprising:
   a processor;
   an Internet WiFi transceiver configured to communicate with devices of a first network;
   a network transceiver configured to communicate with devices of a second network, wherein the devices of the second network comprise a group of nodes, comprising at least one node, and a network controller that determines membership of the group of nodes;
   a first boot image that configures the network transceiver as the network controller that determines membership of the group of nodes;
   a second boot image that configures the network transceiver as a repeater node that does not determine membership of the group of nodes; and
   a flash memory storing the first boot image from which the processor boots to configure the network transceiver as the network controller; and a memory that stores executable instructions that, when executed by the processor, facilitate performance of operations comprising:
  transmitting, via the Internet WiFi transceiver, a request for the network transceiver to operate as the network controller; and
  in response to a command received via the Internet WiFi transceiver, storing the second boot image to the flash memory and rebooting the networking device using the second boot image that configures the network transceiver as a repeater node.

2. The networking device in accordance with claim 1, wherein the networking device includes a thermostat.

3. The networking device in accordance with claim 1, wherein the network transceiver is a Z-Wave network transceiver.

4. The networking device in accordance with claim 3, wherein the first boot image configures the network transceiver as a Z-Wave network controller.

5. The networking device in accordance with claim 3, wherein the second boot image configures the network transceiver as a Z-Wave repeater node.

6. A system for adding a Z-Wave networking device to a Z-Wave network, the system comprising:
  a remote server comprising a processor; and
  the Z-Wave networking device in communication with the remote server, wherein the Z-Wave networking device comprises:
    a WiFi transceiver configured to communicate with the remote server;
    a Z-Wave network transceiver configured to communicate with devices of a mesh network, wherein the devices of the mesh network comprise a group of nodes, comprising at least one node, and a network controller that determines membership of the group of nodes;
    selectable boot images comprising: a first boot image that configures the Z-Wave networking device as the network controller that determines membership of the group of nodes and a second boot image that configures the Z-Wave networking device as a repeater node that does not determine the membership; and
    a flash memory that stores a boot image from which the Z Wave networking device boots;
  wherein the remote server selects, from among the selectable boot images, the boot image to be stored to the flash memory based on a determination of whether the Z-Wave network comprises a device configured as the network controller.

7. The system in accordance with claim 6, wherein the remote server instructs the Z-Wave networking device to load the first boot image into the flash memory and to reboot, resulting in the Z-Wave network transceiver joining the Z-Wave network configured as a Z-Wave controller node when the remote server determines that the Z-Wave network does not comprise the device configured as the network controller.

8. The system in accordance with claim 6, wherein the remote server instructs the Z-Wave networking device to load the second boot image into the flash memory and to reboot, resulting in the Z-Wave network transceiver joining the Z-Wave network configured as a Z-Wave repeater node when the remote server determines that the Z-Wave network already comprises the device configured as the network controller.

9. The system in accordance with claim 6, wherein the Z-Wave networking device is a thermostat.

10. A method comprising:
  receiving, by a device comprising a processor, registration information that identifies a networking device and a user identity to which the networking device is being registered;
  performing, by the device, a status procedure that determines whether a Z-Wave network, comprising a group of nodes and a network controller that determines membership of the group of nodes, is already associated with the user identity;
  in response to the Z-Wave network not being associated with the user identity, associating, by the device, the Z-Wave network with the user identity;
  receiving, by the device, a request to enroll the networking device in in the Z-Wave network, wherein the request indicates a role of the networking device, and wherein the role being requested is determined by a boot image currently stored to a memory of the networking device; and
  in response to determining that the role being requested conflicts with information determined by the status procedure, instructing, by the device, the networking device to load a different boot image into the memory and to reboot.

11. The method in accordance with claim 10, wherein the status procedure further determines whether the Z-Wave network is already associated with the user identity at a specified location associated with the user identity.

12. The method in accordance with claim 10, wherein the determining that the role being requested conflicts with information determined by the status procedure comprises determining, from the status procedure that the Z-Wave network is already associated with the user identity and further determining that networking device has requested to enroll as the network controller that determines the membership.

13. The method in accordance with claim 10, wherein the determining that the role being requested conflicts with information determined by the status procedure comprises determining, from the status procedure that the Z-Wave network is not already associated with the user identity and further determining that networking device has requested to enroll as repeater node that does not determine the membership.

* * * * *